E. I. & J. T. BRAYTON.
MEASURING INSTRUMENT.
APPLICATION FILED APR. 27, 1907.
901,678.
Patented Oct. 20, 1908.
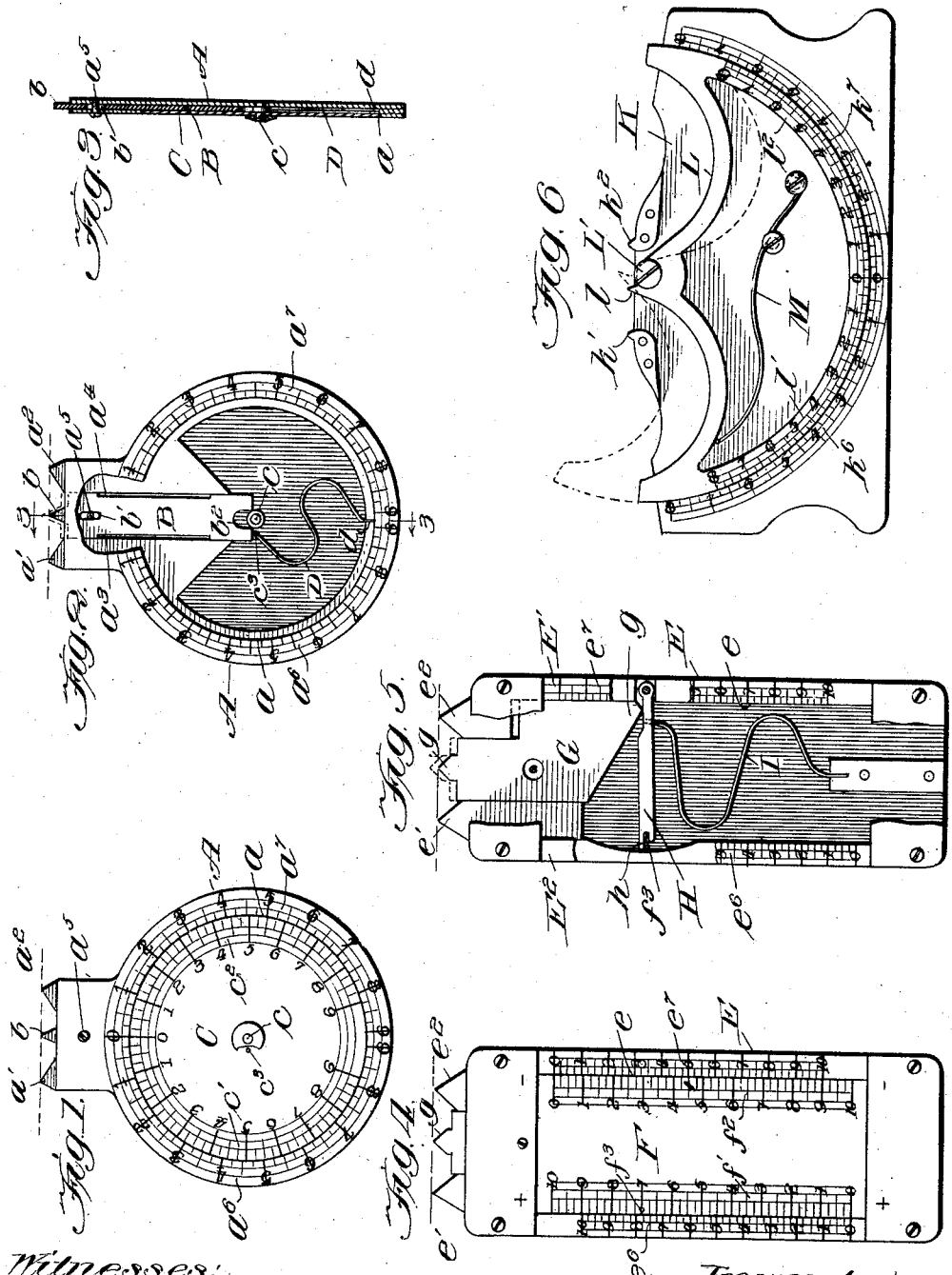

UNITED STATES PATENT OFFICE.

ELIZABETH I. BRAYTON AND JAMES T. BRAYTON, OF CHICAGO, ILLINOIS, ASSIGNORS TO GENEVA OPTICAL COMPANY, OF CHICAGO, ILLINOIS, A CORPORATION OF ILLINOIS.

MEASURING INSTRUMENT.

No. 901,678.  Specification of Letters Patent.  Patented Oct. 20, 1908.

Application filed April 27, 1907. Serial No. 370,548.

*To all whom it may concern:*

Be it known that we, ELIZABETH I. BRAYTON and JAMES T. BRAYTON, citizens of the United States, residing at Chicago, county of Cook, State of Illinois, have invented a certain new and useful Improvement in Measuring Instruments, and declare the following to be a full, clear, and exact description of the same, such as will enable others skilled in the art to which it pertains to make and use the same, reference being had to the accompanying drawings, which form a part of this specification.

Our invention relates to measuring instruments and particularly to that type wherein there are relatively movable parts which coöperate to indicate the characteristic to be determined.

Heretofore it has been necessary, in measuring instruments which are adapted to indicate a wide range of measurements, to provide considerable relative movement between the coöperating indicator portions in order to maintain sufficient distance between successive graduations to render the reading of the instruments easy. Thus it is common to make use of a graduated dial over which a pointer is caused to travel; the pointer moving through a small angle when the value of the reading is small and through a very large angle when a large value is to be indicated. As a result the greater values are determined with much more accuracy than is necessary in order that the instrument may be equally sensitive throughout its range. The difference in sensitiveness at different points within the range of the instrument may of itself not be disadvantageous, but the constructions which bring about such conditions involve the use of complicated and delicate mechanism for unnecessarily multiplying the motion of a contact piece or other primary member; thereby increasing the cost of instruments and making them more liable to get out of order than would be the case with simpler devices.

One of the objects of our invention is to provide a novel form of indicating device for measuring instruments, whereby only a small relative movement between the coöperating indicator members is necessary in order to make it possible to obtain a large number of different readings without danger of confusion because of close proximity of the graduations to each other.

A further object of our invention is to provide a measuring instrument which shall be cheap, simple and compact in construction, and which shall give accurate indications without the use of delicate parts which are apt to get out of order and impair the reliability of the instrument.

To the above end our invention consists in a pair of relatively movable coöperating members each of which is provided with a similar series of graduations; the graduations on one member being differently spaced, however, from the graduations on the other, so that in no position of the two members will more than one set of corresponding graduations or indices register with each other. By properly proportioning the graduations, a wide range of readings may be obtained in an instrument wherein the two members have but a small range of movement; and at the same time the indications will be accurate and may be readily determined by simply observing the index on one member which registers with the corresponding index on the other. In order to make use of this novel arrangement, we provide relatively movable contact pieces or other primary devices and arrange suitable connections between them and the graduated members so as to permit them to effect a relative movement between the graduated members. Thus, although the movement which is given to the contact pieces or other devices may not be greatly multiplied, the graduations may be distributed throughout a considerable distance and no difficulty will be experienced in determining which of the graduations or indices on the members register with each other.

In applying our invention to instruments adapted to act on curved surfaces, as for example instruments intended to determine the focal lengths of lenses, we make use of a plurality of contact pieces, one or more of which are movable and connect with the movable contact piece or pieces one member of the indicating device. The other member of the indicating device may conveniently be fixed with respect to the fixed contact pieces. When a lens is to be measured, the contact pieces are pressed against the surface thereof and the relative movement caused thereby between the contact pieces produces a corresponding movement between the graduated members; the graduations being proportioned to give readings corresponding to the characteristic which is to be determined.

Our invention will be more fully understood and its various objects and advantages will be more clearly apparent from the following detailed description taken in connection with the accompanying drawing. The various features of novelty which characterize our invention will, however, be pointed out with particularity in the appended claims.

In the drawings, Figure 1 is a front elevation of a measuring instrument arranged in accordance with the present invention, the graduated members being illustrated as circular in outline; Fig. 2 is a view of the instrument shown in Fig. 1 with one of the graduated members removed and parts broken away to more clearly show the interior portions; Fig. 3 is a section taken on line 3—3 Fig. 2, looking in the direction of the arrows; Figs. 4 and 5 are views similar to Figs. 1 and 2 showing, however, a further modification wherein the movable graduated member travels in a straight line instead of angularly; and Fig. 6 is a view similar to Fig. 1 showing a further modification embodying the invention in an elemental form.

The instruments illustrated in the drawings are all of the nature of lens measuring instruments, but we wish it to be clearly understood that our invention is not limited in its application to instruments of this type; all of the instruments having been shown as lens measuring instruments in order to illustrate several types without creating confusion on account of necessity of explaining different calibrations.

Reference being had to Figs. 1 to 3 of the drawing, A indicates a flat casing which may be constructed in any suitable form. The casing is cut away on one side so as to provide a circular opening $a$. At what may be called the upper end of the casing are two contact pieces $a'$ and $a^2$ which may be attached to or formed on the casing in any suitable manner. Between these contact pieces is a third contact piece $b$ which is carried on the end of a sliding bar or plate B. This plate is mounted in any suitable way so as to be free to slide a limited distance at right angles to the line joining the ends of the contact pieces. In the arrangement shown, the sliding member is arranged between guides $a^3$ and $a^4$ on the casing and has a slot $b'$ therein, through which projects a screw or pin $a^5$ carried by the casing. The slot and pin connection permits the member to have a limited movement in the casing and at the same time prevents its disengagement therefrom.

C is a circular disk fitting the opening $a$ in the casing and pivoted at its center in any suitable manner so as to lie in the plane of the front of the casing. A shouldered pivot $c$ secured to the casing, may be employed, the shoulder holding the disk clear of the bottom of the casing. The parts are preferably so arranged that the member carrying the movable contact piece is movable radially with respect to the disk. The casing is provided with two series of graduations $a^6$ and $a^7$ extending from and arranged about the opening, and the circular plate is provided with two similar series, $c'$ and $c^2$. The graduations on the disk are arranged adjacent the edge thereof so as to bring them close to the graduations on the casing. The zero point of each series of graduations on the casing is arranged directly in line with the point of the movable contact piece and the pivot on which the disk is mounted. It will be seen that when the common zero point of the graduations on the circular disk registers with the zero point on the casing, no other graduation mark in either series registers with a graduation mark on the coöperating series. This is for the reason that the spaces between the graduation marks on the disk are different from those on the casing so that, although there are the same number of marks or indices in each of the coöperating series, the total angular distance occupied by either outer series is greater than the angular extent of either inner series. It will, of course, be understood that the graduations in the inner series might be spaced farther apart than those in the outer series, if desired. By reason of this proportioning of the graduations, only one of the indices in either series will register with the corresponding index on the coöperating series in any angular position which the circular disk may assume. The member carrying the movable contact piece may be connected to the graduated disk in any suitable manner, so that the disk is caused to rotate in one direction or the other when the movable contact piece moves in or out. A convenient means of accomplishing this is to provide the disk with a pin or projection $c^3$ which is displaced slightly from the center of the disk. The end of the sliding bar may be formed as at $b^2$ so as to engage with this pin and produce a rotation of the disk in one direction as the movable contact piece is moved inwardly. The rotation of the disk in the opposite direction may be effected by means of a spring D which may conveniently be a small flat or wire spring secured at its one end to the casing as at $d$ and having its other end secured to the disk. The spring is so shaped that it tends to hold the disk in the position wherein it forces the movable contact piece outward as far as it will go. When, however, the contact piece is forced inwardly, the disk is rotated in the opposite direction against the tension of the spring.

If desired, the end of the spring which is attached to the disk may serve as the pin $c^3$, thereby doing away with an additional element; but this is, of course, a matter of choice. The parts are so arranged that when the ends of the three contact pieces are in alinement, the two zeros will register with each other. When the movable contact piece moves either outward or inward from this line, the zero point on the graduated disk moves respectively toward the right or the left of the zero on the fixed scales.

In using the instrument, the contact points are pressed against the surface from which the measurement is to be taken; and, if the movable zero is on the right hand side of the fixed zero, the two coöperating series of graduations on the right hand side, namely the series $a^7$ and $c^2$, are examined in order to ascertain which index on the movable member registers with the corresponding index on the stationary member. As previously stated, only one set of such indices will register in any position of the movable member. It will be seen that a slight inward movement of the movable contact piece will cause the indices 1, 1 to register; a slightly further movement will cause the indices 2, 2 to register; in the same way additional increments of movement of the movable contact piece will cause the remaining indices to register in succession. Therefore, although the total movement of the contact piece is quite small and the angular movement of the graduated disk is also comparatively small, a large scale is provided on which the readings may be conveniently and accurately observed. When the instrument is used as a lens measurer a depression of the movable contact below the line joining the other two contacts, in the manner described, is effected by pressing the instrument against the convex side of the lens. In order to measure a concave lens surface, it is pressed in the same way against the contact pieces, the movable contact being forced inwardly from its normal position so as to force the movable zero from its extreme left hand position to some position nearer the stationary zero. The reading in this instance is taken from the left hand side of the instrument, that is, the series of scales $a^6$ and $c'$ are examined until two indices are found to register exactly.

In Figs. 4 and 5 we have shown an arrangement wherein the movable graduated member travels in a straight line instead of angularly as in the first arrangement. The casing E in this instance may be made rectangular and have a portion of its front face cut away as at $e$. The size of the opening is such that narrow strips E' and $E^2$ remain on opposite sides thereof and on these strips are placed graduated scales $e^6$ and $e^7$ corresponding to the series of scales $a^6$ and $a^7$ in Figs. 1 and 2. The movable graduated member F has two scales $f'$ and $f^2$ which coöperate respectively with the series of scales $e^6$ and $e^7$. Since the several scales on each member are not arranged end to end, each is provided with a separate zero point. Furthermore, the scales on the right hand side are read downwardly and those on the left hand side upwardly. The scales are so arranged that when the two zeros on the right hand set of scales register at the top of the instrument the two zeros of the left hand set register at the bottom of the instrument. The movable graduated member is actuated in any suitable manner, as for example by means of a sliding plate G corresponding to the member B in the other modification and having at its outer end a contact piece $g$ arranged between two fixed contact pieces $e'$ and $e^2$ corresponding to the contact pieces $a'$ and $a^2$. Any suitable transmission devices may be arranged between the member G and the sliding plate so that; when the ends of the three contact pieces are in alinement both sets of zero points will be in registration; while upon a depression of the contact piece the zeros on the movable member will travel down past the stationary zeros; and, upon a movement of the contact piece outwardly beyond the ends of the stationary contacts, the movable zeros will travel upwardly past the stationary zeros. The readings are made in exactly the same way as with the other instruments; that is, when the contact pieces are pressed against a surface and the zeros register, it is known that the surface is a plane surface, while if the movable zero points drop below the stationary zero points it will be known that the surface is convex, the measurement being given by the left hand series of scales and its value being determined by the similar indices which are in registration with each other. On the other hand if the movable zeros are carried to some point above the stationary zeros it will be known that the surface is concave and the measurement is determined by the similar indices which register with each other on the two right hand scales. A convenient method of transmitting the movement of the contact piece $g$ to the sliding plate consists in pivoting to the casing a lever H which is connected at its free end in any suitable way to the sliding plate. Thus, for example, the plate may be provided with a pin $f^3$ which is received within a jaw $h$ in the lever. The parts are so arranged that the inner end or nose $g'$ of the member G engages with the side of the lever intermediate its pivotal point and the point of engagement thereof with the pin $f^3$. Therefore as the contact piece is moved inwardly, the lever is oscillated and the graduated plate is caused to slide in the same direction as the contact piece, but through a greater distance determined by the proportion of the several lever arms. A spring I may be arranged within the casing so as to bear at one end against the casing, and at the other end against the lever, the spring being under tension so that when free to do so it oscillates the lever in the direction to force the movable contact outwardly as far as it will go. Therefore when the movable contact is forced inwardly it rotates the lever and moves the graduated plate against the tension of the spring. It will be seen that in this arrangement, also, a large number of readings may be conveniently and accurately made without necessitating a wide range of relative movement between the series of scales, because of the fact that the graduations are widely distributed and there is no danger of mistaking the indication which the instrument presents.

In Fig. 6 there is shown a very simple form of our invention. The plate K corresponding to the casings A and E has pivoted on one side thereof a segment L. The segment is provided with a contact piece $l$ arranged near the pivot L' about which the segment rotates. Contact pieces $k'$ and $k^2$ are secured to or formed on the member K at opposite sides of the movable contact piece. The segment is provided with two series of graduations, $l'$ and $l^2$, which read in opposite directions from a central zero point. The member K is provided with two similar series of graduations, $k^6$ and $k^7$, also reading in opposite directions from a zero point which registers with the zero point on the segment when the ends of the three contact pieces are in a straight line. As in the other forms of our invention, the series of scales $l'$ and the series of scales $k^6$ have the same number of graduations but they are differently proportioned so that only one index on either series of scales will register with the corresponding index on the other series of scales in any position of the segment. Similarly the series of scales $l^2$ and $k^7$ are alike as to the number of graduations, but differ from each other in the proportions of the graduations. The method of using this instrument is the same as that of using the others, that is, the several contact pieces are pressed against a surface, and; if the surface is plane, the two zeros will register with each other; if the surface is convex, one of the indices on the right hand scale of the segment will register with the corresponding index on the stationary member; if the surface is concave, the movable zero point will travel toward the left from the stationary zero point and the desired measurement is ascertained by examining the left hand scales and ascertaining which of the indices on one registers with the corresponding index on the other. For convenience in manipulation of the instrument, a spring M may be provided for normally oscillating the segment as far as it will go in the direction which carries the movable contact piece outward. Then in order to take a measurement from any surface which falls within the range of the instrument, it is only necessary to place the contact pieces against the surface and the spring will hold the segment in the position to which it is moved by the movable contact piece. It will be seen, however, that the spring in this and the other constructions may be omitted without changing the operation of the instruments; the spring in each instance making it convenient, however, to ascertain the indication without requiring any manipulation of the movable graduated member, so that the entire attention of the operator may be directed to the proper placing of the contact pieces against the surface.

It will of course be understood that the instruments may be calibrated in any desired way and so as to indicate any desired characteristic of the object which is to be measured. For example the scale or scales on the stationary part may be arbitrarily selected; the contact points may be brought into engagement with a plane surface and zero marks may be made upon a movable member so as to register with the stationary zero marks; and the remainder of the movable scales may then be formed by placing the contact points successively against known standards, there being in each instance placed upon the movable member a mark which registers with the mark on the fixed scale which has a designating character representing the characteristic of the standard which it is desired to indicate on the instrument.

Having now fully described our invention, what we claim as new and desire to secure by Letters Patent is:

1. A measuring instrument comprising a pair of relatively movable coöperating members, a series of indices on each member, the indices of the same series being differently designated and the designations of one series corresponding with those of the other, the indices being so arranged that only one of the indices on either member registers with the correspondingly designated index on the other member in any relative position of the members, a plurality of relatively movable contact pieces, and means for causing the zero indices on said members to register when the contact pieces lie in a predetermined line and for causing said zero indices to be displaced from each other and other correspondingly designated indices to be brought into registration with each other as one of said contact pieces is moved out of said line.

2. A measuring instrument comprising a pair of relatively movable coöperating members, a series of indices on each member, the indices of the same series being differently designated and the designations of one series corresponding with those of the other, the indices being so arranged that only one of the indices on either member registers with the correspondingly designated index on the other member in any relative position of the members, a plurality of relatively movable contact pieces, and means for causing the zero indices on said members to register when the contact pieces lie in a predetermined line and for causing said zero indices to be displaced from each other in one direction or the other as one of said contact pieces is moved in one direction or the other from said line.

3. A measuring instrument comprising a pair of coöperating members movable relatively to each other and having coöperating graduated scales, each of said scales consisting of the same number of correspondingly designated indices so related to each other that no two indices on one scale register with the correspondingly designated indices on the other scale in any relative position of the scales, and the calibrations being such that the reading of the instrument is given by the designation of either of two similarly designated indices which may be in registration with each other in any relative position of the scales.

4. A measuring instrument comprising a pair of coöperating graduated scale members movable relatively to each other, each of said scale members having thereon the same number of correspondingly designated indices, the grouping of the indices being such that no two indices on one scale register with the corresponding indices on the other scale in any relative position of the scales, a plurality of relatively movable contact pieces, and connections between said members and said contact pieces for causing a relative movement between said contact pieces to effect a corresponding relative movement between the said members and their coöperating scales, the calibrations being such that the reading of the instrument is given by the designation of either one of any two similarly designated indices which may be in registration with each other in any relative position of said members.

5. A measuring instrument comprising a pair of relatively movable members each of which has two series of divisions, the divisions on each member being separated by a series of indices designated by characters corresponding to the designating characters associated with the indices of the corresponding series of divisions on the other member, said divisions being so proportioned that no two indices on one member register with the corresponding indices on the other member, the location of the several series of divisions being such that both pairs of zero indices are in registration in one relative position of said members, and the calibration of the instrument being such that the reading is given by either one of any two similarly designated indices which may at any time be in registration with each other.

6. A measuring instrument comprising a pair of relatively movable members, each of said members having thereon a similarly numbered series of indices, said indices being so arranged that only one index on one member registers with its correspondingly numbered index on the other member in any relative position of the members, and the calibration being such that the reading of the instrument is given by the designating number of the two similarly numbered indices which may at any time be in registration with each other.

7. A measuring instrument comprising a plurality of relatively movable contact pieces and a pair of coöperating scale members operatively connected with said contact pieces; one of said scale members being divided into subdivisions whose lengths are arbitrary; the other of said scale members being divided into an equal number of subdivisions; there being between each two consecutive sub-divisions of each scale an index having a designating character associated therewith; the designating characters for corresponding indices on the two scale members being the same; the relative lengths of the sub-divisions of the two scale members being such that no more than two similarly designated indices register in any relative position of the scale member; and the calibration of the instrument being such that the reading thereof is given by either one of the two similar designating characters of any two corresponding indices which may at any time be in registration.

8. In a measuring instrument, a plurality of relatively movable contact pieces, a pair of coöperating scale members operatively connected with said contact pieces, each of said scale members having thereon the same number of indices and the same series of characters designating the indices, a spring operatively associated with said contact pieces to hold them normally in one extreme position relatively to each other, the connections between the said contact pieces and said members being such that a relative movement between said contact pieces produces a corresponding relative movement between said members, the arrangement being such that when the contact surfaces of the contact pieces lie in a straight line the zero indices register with each other while for any other relative position of the contact pieces no two indices on one member register with the correspondingly designated indices on the other member.

9. In a measuring instrument, a pair of relatively movable members, each of said members having thereon two scales each of which coöperates with one of the scales on the other member, the scales of each coöperating pair comprising the same number of indices and the same series of designating characters for the indices, a plurality of relatively movable contact pieces, connections between said contact pieces and said members for producing a relative movement between said members upon a relative movement between said contact pieces, the arrangement of the scales being such that the zero indices of each pair register with each other when the contact surfaces of said contact pieces lie in a straight line and no two indices of any scale register with the two similarly designated indices of the coöperating scale in any position of the scales, and the calibration of the instrument being such that the reading thereof is given by the designating character of either of two similarly designated indices which may be in registration with each other.

10. In a measuring instrument, a pair of relatively movable members, two series of scales on each member each coöperating with one of the two corresponding series of scales on the other member, each two coöperating series of scales having the same number of indices and the same series of designating characters for said indices, contact pieces associated with said members so as to produce a relative movement between said members upon a relative movement between the contact pieces, the arrangement of parts being such that when the contact surfaces of said contact pieces lie in a straight line the zero indices of each two coöperating series of scales register with each other, and one of said coöperating series of scales giving the reading of the instrument when one of the contact surfaces is on one side of said straight line and the other of said coöperating series of scales giving the reading of the instrument when one of the contact surfaces is on the other side of said straight line.

11. In a measuring instrument, a pair of relatively movable plates, fixed contact pieces on one of said plates, a lever pivoted to said latter plate and connected to the other plate, a movable contact piece engaging with said lever so as to produce a relative movement between said plates upon a relative movement between said contact pieces, each of said plates having a series of coöperating scales thereon, each of said series of scales having thereon the same number of indices and the same series of designating characters for said indices, and the arrangement being such that no more than two similarly designated indices register with each other in any relative position of said contact pieces.

12. A measuring instrument comprising a pair of coöperating members having a limited relative movement, each of said members having thereon a series of the same number of indices, corresponding indices in each series being similarly designated, the indices on each member being distributed parallel with the direction of said relative movement and over a distance greater than said movement, and the grouping of the indices being such that no two indices on one member register with the corresponding indices on the other member in any relative position of said members, a plurality of relatively movable contact pieces, and connections between said contact pieces and said members for causing a relative movement between said contact pieces to effect a corresponding movement between said members, the calibration being such that the reading of the instrument is given by the designation of either one of any two similarly designated indices which may be in registration with each other in any relative position of the two members.

13. A measuring instrument comprising a pair of coöperating members having a limited relative movement, each of said members having thereon two series of indices, one of the series of indices on each member coöperating with one of the series on the other member and the indices of each pair of coöperating series having corresponding designating characters, the indices on each member being distributed parallel with the direction of said relative movement and over a distance greater than said movement, and the grouping of the indices being such that no two indices of one series register with the correspondingly designated indices of the coöperating series, the arrangement being such that the zero indices of both pairs are in registration in one relative position of said members, and the calibration of the instrument being such that the reading is given by the designation of either one of any two similarly designated indices of either pair of coöperating series which may at any time be in registration with each other.

In testimony whereof, we sign this specification in the presence of two witnesses.

ELIZABETH I. BRAYTON.
JAMES T. BRAYTON.

Witnesses:
WM. F. FREUDENREICH,
HARRY S. GAITHER.